June 14, 1966 L. L. LOWE 3,255,768
AUTOMOBILE SLEEPING UNIT
Filed Nov. 26, 1963 3 Sheets-Sheet 1

INVENTOR.
Lyall L. Lowe
BY
Sam J. Slotsky
ATTORNEY

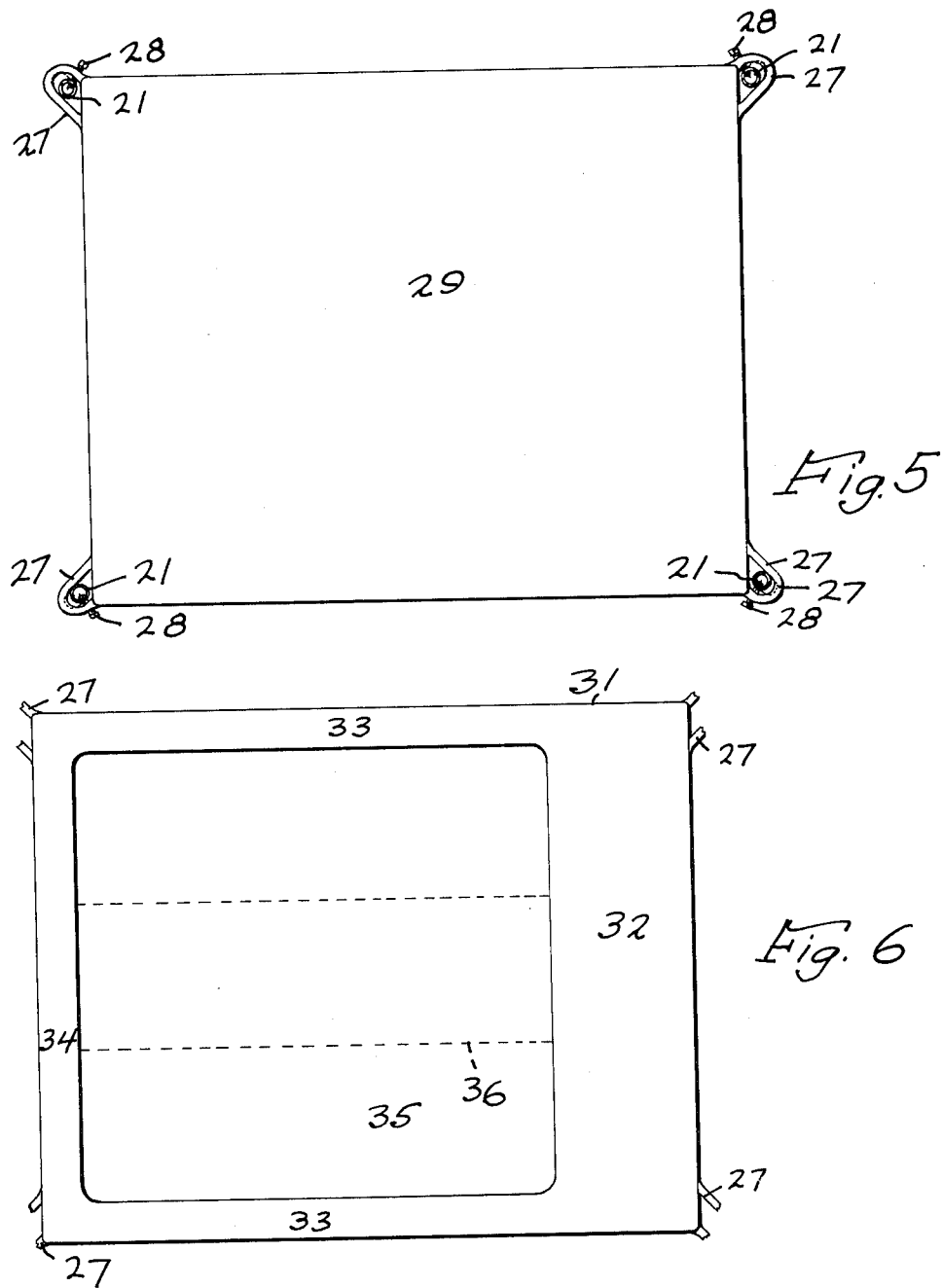

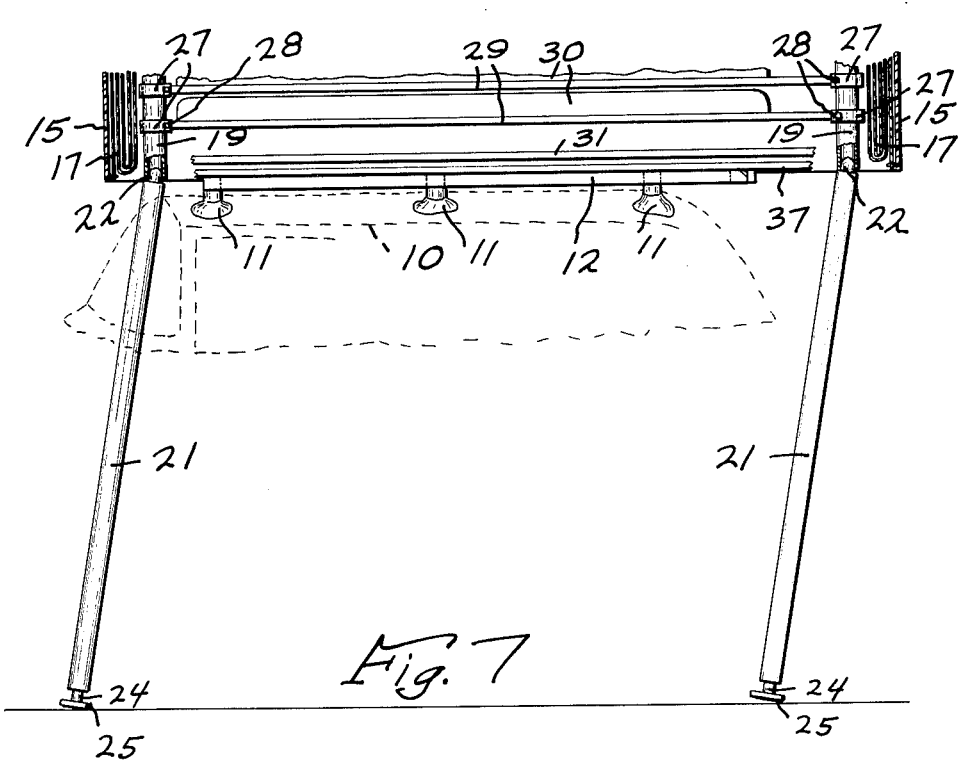
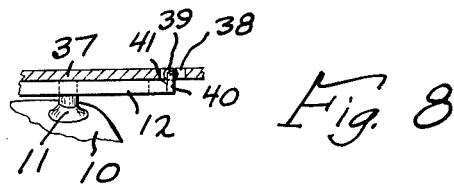

3,255,768
AUTOMOBILE SLEEPING UNIT
Lyall L. Lowe, 2405 E. 4th St., Sioux City, Iowa
Filed Nov. 26, 1963, Ser. No. 326,069
3 Claims. (Cl. 135—1)

My invention relates to an automobile sleeping unit.

An object of my invention is to provide an automobile sleeping unit which can be conveniently carried on the top of the automobile and transported thereby to any desired location, the unit then being readily converted into a complete enclosing unit having a series of vertically spaced sleeping bunks therein, or which can be used as a housing unit, etc.

A further object of my invention is to provide such a unit in a compact structure, and in a modified form to provide a unit which will automatically be raised when the automobile moves forward.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 5 is a sectional view taken generally along the line 5—5 of FIGURE 1,

FIGURE 6 is a sectional view taken generally along the line 6—6 of FIGURE 1,

FIGURE 7 is a sectional view of a modified form, and

FIGURE 8 is a further detail.

Figure 1:
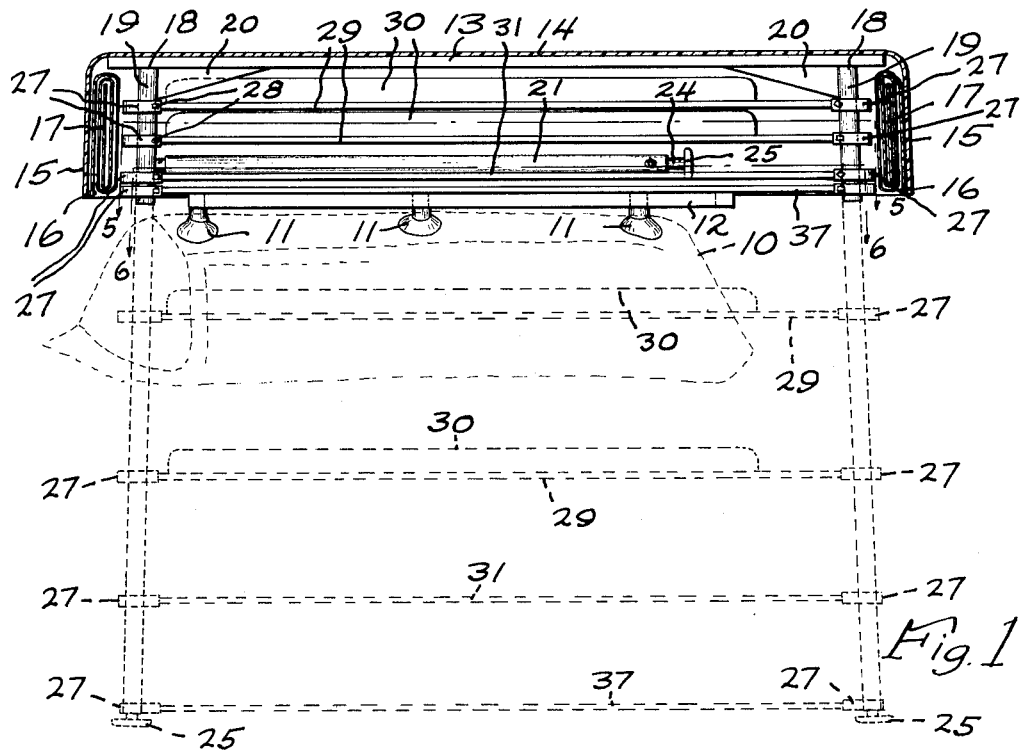
FIGURE 1 is a side sectional view of the unit in its collapsed form.
Figure 2:
FIGURE 2 is a detail of one of the supporting rods.
Figure 3:
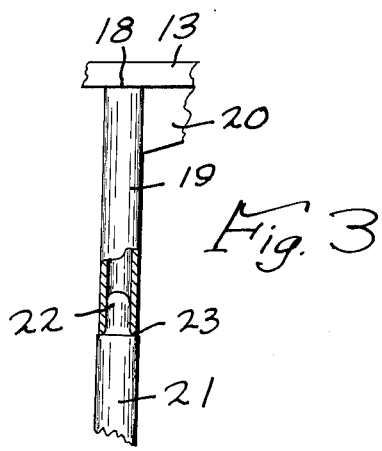
FIGURE 3 is a further enlarged detail.
Figure 4:
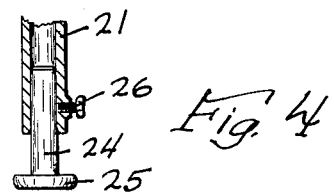
FIGURE 4 is an enlarged detail.

In describing my invention, I have used the character 10 to designate the top of an automobile to which is attached at 11 a framework member 12 on which the unit of my invention is supported, and I have further used the character 13 to indicate a flat member to which is attached the enclosing dome member 14 having the side walls 15, and attached as at 16 to these walls are the folded over fabric portions 17 which will be unfolded to provide external side covers to the unit when desired, the various corners of the members 17 being attached by mechanical zippers or in any other way, it being understood that there will be a member 17 for all of the sides.

Rigidly attached to the member 13 at 18 are the tubes 19, which can be pitched at a slight angle if desired. The character 20 indicates gussets which provide additional means for bracing the tubes 19.

The character 21 indicates four support members having the rounded end portions 22 which are adapted to be received in the lower ends of the tubes 19, which lower ends can be slightly rounded as at 23.

The lower ends of the members 21 receive the male rods 24 which are secured to the base members 25, the threaded wingnuts 26 being adapted to adjustably secure the members 24.

The character 27 indicates a series of collars or sleeves having the setscrews 28 threadably engaged therewith, and which are adapted to engage the tubes 19 or to pass within suitable spaced openings in the support members 21.

Certain other collar members 27 are attached to flat members 29 upon which are placed the mattresses or pads 30, a further member 31 being formed as shown in FIGURE 6, having a table or platform portion 32 and having the framework portions 33 and 34, and by leaving an open space at 35, the character 36 indicating by dotted lines an additional table structure formation if desired.

The character 37 indicates a lower most flat member which will provide a floor, when the unit is utilized as a housing structure before the mattresses are lowered.

The unit is operated in the following manner.

Usually the lowermost collars 27 which are attached to the member 37 will be tightly secured, and will support the other members are shown clearly in FIGURE 1.

When it is desired to first use the unit as a housing unit, the members 21 are removed, the ends 22 are successively inserted in the lower ends 23 of the tubes 19 and are then raised at each corner, the entire unit then being raised off of the member 12 after being untied therefrom, and then the automobile can be driven forwardly out of the structure, and the floor member 37 can be lowered to the base members 25, and next the unit 31 can be lowered to provide a space within the areas 35 for the occupants, and the portions 32 can be used to store small oil stoves, or any other type of necessary items. It will be understood that when these units are lowered, that at first the locking members 28 will be in attached position, and can be loosened if desired, and when it is desired to lower the sleeping accommodations, the members 29 are lowered to the dotted positions shown in FIGURE 1 and with the setscrews 28 being in place in the openings, these various arrangements providing additional rigidity and strength. The members 24 provide means for compensating any of the corners in case of any irregular ground space, etc.

In some cases wherein the upper unit portions may be quite heavy, the arrangement shown in FIGURES 7 and 8 can be used, and in this form identical characters will indicate identical parts, and when this form is used, the ends 22 of the members 21 are first slipped into the lower ends 23 of the tubes 19, the members 24 already being rigidly secured, and in this form of structure, the member 37 will include an opening 38 in which is received a roller 39 journalled on the bracket 40 which is attached to the rear of the member 12. When the automobile is moved forwardly, the roller 39 will engage the portion 41 (see FIGURE 8) which will correspondingly carry the upper unit portions forwardly until the supports 21 are in vertical engaged position, and the roller 39 will then roll beneath the member 37, so that the automobile can be driven completely out of the unit, and then the various members can be let down or lowered as above described.

As stated heretofore the fabric portions 17 can be made in any manner desired, can include cut-out windows, etc., etc.

It will now be noted that I have provided the various advantages mentioned in the objects of my invention with other advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. An automobile sleeping unit comprising an upper framework adapted to be carried on the top of said automobile, said framework including a plurality of vertically positioned members, substantially flat members including adjustable collars engaging said vertical members, support posts engaging said vertical members, means for attaching said substantially flat members at vertically spaced distances to said support members when said collars are slid down to engage said support posts, said support posts being adapted to support said upper framework from the ground.

2. An automobile sleeping unit comprising an upper framework adapted to be carried on the top of said automobile, said framework including a plurality of vertically positioned members, substantially flat members including adjustable collars engaging said vertical members, support posts engaging said vertical members, means for attaching said substantially flat members at vertically spaced distances to said support members when said collars are slid down to engage said support posts, said support posts being adapted to support said upper framework from the ground, a dome member attaching to said upper framework, pliable enclosing members attached to said dome member.

3. An automobile sleeping unit comprising an upper framework adapted to be carried on the top of said automobile, said framework including a plurality of vertically positioned members, substantially flat members including adjustable collars engaging said vertical members, support posts engaging said vertical members, means for attaching said substantially flat members at vertically spaced distances to said support members when said collars are slid down to engage said support posts, said support posts being adapted to support said upper framework from the ground, a dome member attaching to said upper framework, pliable enclosing members attached to said dome member, the lowermost of said substantially flat members providing a floor, a further of said substantial flat members having an open space and a platform space.

References Cited by the Examiner

UNITED STATES PATENTS

| | | | |
|---|---|---|---|
| 2,710,977 | 6/1955 | Fannin | 135—1 |
| 2,868,401 | 1/1959 | Lelois | 296—35.1 X |
| 2,938,525 | 5/1960 | MacKinlay | 135—1 |
| 3,111,955 | 11/1963 | Green | 135—1 |

FOREIGN PATENTS 1,270,934   7/1961   France.

BENJAMIN HERSH, *Primary Examiner.*

A. HARRY LEVY, *Examiner.*

P. GOODMAN, *Assistant Examiner.*